United States Patent
Kim et al.

(10) Patent No.: US 11,611,066 B2
(45) Date of Patent: Mar. 21, 2023

(54) SULFUR-CARBON COMPOSITE AND METHOD FOR PREPARING SAME

(71) Applicant: LG CHEM, LTD., Seoul (KR)

(72) Inventors: Soohyun Kim, Daejeon (KR); Suenghoon Han, Daejeon (KR); Kwonnam Sohn, Daejeon (KR); Doo Kyung Yang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 518 days.

(21) Appl. No.: 16/631,691

(22) PCT Filed: Oct. 29, 2018

(86) PCT No.: PCT/KR2018/012946
§ 371 (c)(1),
(2) Date: Jan. 16, 2020

(87) PCT Pub. No.: WO2019/088630
PCT Pub. Date: May 9, 2019

(65) Prior Publication Data
US 2020/0152971 A1    May 14, 2020

(30) Foreign Application Priority Data
Oct. 30, 2017  (KR) .................. 10-2017-0142280

(51) Int. Cl.
*H01M 4/36*    (2006.01)
*H01M 4/38*    (2006.01)
(Continued)

(52) U.S. Cl.
CPC .......... *H01M 4/364* (2013.01); *C01B 32/168* (2017.08); *C01B 32/21* (2017.08); *H01M 4/38* (2013.01);
(Continued)

(58) Field of Classification Search
CPC .......... B01J 21/18; H01M 4/364; H01M 4/38; H01M 4/587; H01M 10/052;
(Continued)

(56) References Cited

U.S. PATENT DOCUMENTS

2004/0241532 A1  12/2004  Kim
2011/0052998 A1* 3/2011  Liang .................... H01M 4/581
                                                 429/300
2016/0248087 A1   8/2016  Kim et al.

FOREIGN PATENT DOCUMENTS

CA    2322131 A1 *  8/1999  ............. H01M 4/04
CN    102719070 A * 10/2012 ............ C01B 32/159
(Continued)

OTHER PUBLICATIONS

English translation of the Written Opinion for PCT/KR2018/012946. (Year: 2019).*

(Continued)

*Primary Examiner* — Patricia L. Hailey
(74) *Attorney, Agent, or Firm* — Birch, Stewart, Kolasch & Birch, LLP (57) ABSTRACT

A method for preparing a sulfur-carbon composite including: (a) stirring a porous carbon material in a solvent mixture including a carbonate-based compound and a volatile solvent and then drying; and (b) mixing the dried porous carbon material with sulfur and then depositing the sulfur in and on the porous carbon material by a heat melting method. A method for preparing a sulfur-carbon composite including: (a) mixing and stirring a porous carbon material and sulfur in a solvent mixture including a carbonate-based compound and a volatile solvent and then drying; and (b) depositing the sulfur in and on the porous carbon material by a heat melting method. In the sulfur-carbon composite, sulfur present in and on the porous carbon material, a proportion of β-mono- (Continued)

clinic sulfur phase to sulfur contained in the sulfur-carbon composite is 90% or more based on a total molar ratio of sulfur.

15 Claims, 4 Drawing Sheets

(51) Int. Cl.
*H01M 4/587* (2010.01)
*H01M 10/052* (2010.01)
*C01B 32/168* (2017.01)
*C01B 32/21* (2017.01)
*H01M 4/02* (2006.01)

(52) U.S. Cl.
CPC ......... *H01M 4/587* (2013.01); *H01M 10/052* (2013.01); *H01M 2004/021* (2013.01); *H01M 2004/028* (2013.01)

(58) Field of Classification Search
CPC ...... H01M 2004/021; H01M 2004/028; C01B 32/168; C01B 32/21; C01P 2002/70; C01P 2002/90
USPC .................................. 502/180, 216; 423/414
See application file for complete search history.

(56) References Cited

FOREIGN PATENT DOCUMENTS

| | | | | | |
|---|---|---|---|---|---|
| CN | 103000378 | A | * | 3/2013 | ............ Y02E 60/13 |
| CN | 103178247 | A | * | 6/2013 | ............ Y02E 60/10 |
| CN | 103247799 | A | * | 8/2013 | ............ Y02E 60/10 |
| CN | 104201339 | A | * | 12/2014 | ............ H01M 4/139 |
| CN | 104766967 | A | * | 7/2015 | ............ H01M 4/362 |
| CN | 105900268 | A | * | 8/2016 | ............ H01M 10/052 |
| CN | 105990268 | A | | 8/2016 | |
| CN | 106025231 | A | | 10/2018 | |
| CN | 111065600 | A | * | 4/2020 | ............ C01B 17/00 |
| EP | 3208871 | A1 | | 8/2017 | |
| JP | 2004119367 | A | * | 4/2004 | ............ H01M 10/052 |
| KR | 10-2014-0091293 | A | | 7/2014 | |
| KR | 10-2016-0029475 | | * | 3/2015 | ............ H01M 10/052 |
| KR | 10-2015-0045363 | A | | 4/2015 | |
| KR | 10-2016-0029475 | A | | 3/2016 | |
| KR | 10-2016-0037084 | A | | 4/2016 | |
| KR | 10-2016-0061033 | A | | 5/2016 | |
| KR | 10-2016-0078734 | A | | 7/2016 | |
| WO | WO-2012100301 | A1 | * | 8/2012 | ............ B82Y 30/00 |
| WO | WO-2017047998 | A1 | * | 3/2017 | ............ H01M 10/052 |
| WO | WO-2019103409 | A1 | * | 5/2019 | ............ C01B 17/02 |

OTHER PUBLICATIONS

Extended European Search Report for European Application No. 18874049.2, dated Apr. 30, 2020.
Ji et al., "Porous carbon nanofiber-sulfur composite electrodes for lithium/sulfur cells," Energy Environ. Sci., vol. 4, 2011, pp. 5053-5059.
International Search Report issued in PCT/KR2018/012946 (PCT/ISA/210), dated Apr. 12, 2019.
Jung et al., "Monoclinic sulfur cathode utilizing carbon for high-performance lithium-sulfur batteries", Journal of Power Sources, vol. 325, 2016, pp. 495-500.
Hong, "Deep Processing of Chemical Organic Raw Materials", Chemical Industry Press, Jun. 1997, pp. 1-6, with an English translation.
Yan et al., "Long-life, high-efficiency lithium/sulfur batteries from sulfurized carbon nanotube cathodes", Journal of Materials Chemistry A, vol. 3, 2015, pp. 10127-10133.

* cited by examiner

SULFUR-CARBON COMPOSITE AND METHOD FOR PREPARING SAME

TECHNICAL FIELD

This application claims priority to and the benefits of Korean Patent Application No. 10-2017-0142280, filed with the Korean Intellectual Property Office on Oct. 30, 2017, the entire contents of which are incorporated herein by reference.

The present invention relates to a sulfur-carbon composite and a method for preparing the same.

BACKGROUND ART

Recently, interests in energy storage technology have been increasingly higher. As its application has been extended to energy for mobile phones, camcorders and notebook PCs and even to energy for electric vehicles, efforts on the research and development for electrochemical devices have been actualized more and more.

In this aspect, electrochemical devices are a most spotlighted field and among these, development of secondary batteries capable of charge and discharge has been the focus of attention. Recently, in developing such batteries, research and development on the design of new electrodes and batteries for enhancing capacity density and energy efficiency have been progressed.

Among currently used secondary batteries, lithium secondary batteries developed in early 1990s have received attentions with advantages of having high operating voltage and significantly higher energy density compared to the conventional batteries such as Ni-MH, Ni—Cd and sulfuric acid-lead batteries using an aqueous liquid electrolyte.

In particular, Lithium-Sulfur (Li—S) battery is a secondary battery that uses a sulfur-based material with an S—S bond (Sulfur-Sulfur bond) as a positive electrode active material, and lithium metal as a negative electrode active material. Sulfur, the main material of the positive electrode active material, has advantages of richness in resources, having no toxicity and low atomic weight. Further, Lithium-Sulfur battery has theoretical discharge capacity of 1675 mAh/g-sulfur and theoretical energy density of 2,600 Wh/kg, which are much higher than theoretical energy density (Ni-MH battery: 450 Wh/kg, Li—FeS battery: 480 Wh/kg, Li—$MnO_2$ battery: 1,000 Wh/kg, Na—S battery: 800 Wh/kg) of other battery systems currently being studied. Thus, it is the most promising battery among the currently developed batteries.

During the discharge reaction of the Lithium-Sulfur battery, lithium is oxidized in the negative electrode (Anode), and sulfur is reduced in the positive electrode (Cathode). Sulfur before discharging has a ring-shaped $S_8$ structure. The electrical energy is stored and generated by the oxidation-reduction reaction in which the S—S bond is broken and the oxidation number of S is decreased during the reduction reaction (discharging), and the S—S bond is reformed and the oxidation number is increased during the oxidation reaction (charging). During this reaction, sulfur is converted from the ring-shape $S_8$ into a linear structure of lithium polysulfide ($Li_2S_x$, x=8, 6, 4, 2) by the reduction reaction. Ultimately, when the lithium polysulfide is completely reduced, lithium sulfide ($Li_2S$) is finally produced. Unlike a lithium ion battery, the discharge behavior of the Lithium-Sulfur battery is characterized by showing a gradual discharge voltage by the reduction process into each lithium polysulfide.

However, in the case of this Lithium-Sulfur battery, problems of low electrical conductivity of sulfur and dissolution and volume expansion of lithium polysulfide during charging and discharging, and thus problems of low Coulomb efficiency and rapid capacity reduction caused by charging and discharging should be solved.

In this lithium-sulfur battery system, when manufacturing an S/CNT composite in the conventional Lithium-Sulfur battery, there was a problem that the best performance cannot be exhibited when the battery is driven due to uneven coating of the non-conductive sulfur and a conductivity problem. Further, after manufacturing the S/CNT composite, there was a problem that the reactivity is reduced due to reduction of the specific surface area and dissolution of lithium polysulfide.

Accordingly, when the sulfur was deposited in the CNT, it was necessary to deposit sulfur of a phase having high reactivity.

However, when the sulfur and the CNT were generally complexed by a heat melting method, there was a problem that sulfur of an orthorhombic phase was deposited into the CNT and the reactivity was not high.

Thus, it is necessary to introduce a method which is easy to process and uses a process of converting phase by a simple method and depositing so as to coat a material capable of reducing the occurrence of overvoltage and enhancing the internal reactivity.

PRIOR ART DOCUMENT (Patent Document 1)

Korean Patent Publication No. 10-2014-0091293, "Electrode including mixed composite of self-assembled carbon nanotube and sulfur for lithium-sulfur battery, and the fabrication method thereof"

DISCLOSURE

Technical Problem

Accordingly, the present inventors had been continuing various researches and completed the present invention by confirming that when CNT is modified by treatment with a solvent mixture of a carbonate-based compound and a volatile solvent and sulfur is deposited to prepare an S/CNT composite having highly reactive β-monoclinic sulfur phase, the phase-changed sulfur or the sulfur having multi-phase can be deposited.

Accordingly, an object of the present invention is to provide a sulfur-carbon composite coated with a material capable of reducing the occurrence of overvoltage and enhancing the internal reactivity by depositing the sulfur having highly reactive β-monoclinic sulfur phase into CNT, and a method for preparing the same.

Technical Solution

In order to accomplish the objects described above, provided is a method for preparing a sulfur-carbon composite comprising the following steps of: (a) stirring a porous carbon material in a solvent mixture of a carbonate-based compound and a volatile solvent, and then drying thereof; and (b) mixing the porous carbon material with sulfur and then depositing the sulfur by a heat melting method.

Further, the present invention provides a method for preparing a sulfur-carbon composite comprising the following steps of: (a) mixing and stirring a porous carbon material and sulfur in a solvent mixture of a carbonate-based compound and a volatile solvent, and then drying thereof; and (b) depositing the sulfur in the porous carbon material by a heat melting method.

Further, the present invention provides a sulfur-carbon composite comprising: a porous carbon material; and sulfur in at least a part of the inside and the surface of the porous carbon material, wherein the proportion of the β-monoclinic sulfur phase to the sulfur contained in the sulfur-carbon composite is 90% or more based on the total molar ratio of the sulfur.

Advantageous Effects

The present invention has effects that it can maintain the specific surface area of a composite and can inhibit dissolution of lithium polysulfide, and also can reduce the occurrence of overvoltage and can increase the internal reactivity unlike the prior art, by depositing the sulfur having highly reactive β-monoclinic sulfur phase into CNT.

BEST MODE

Hereinafter, preferred examples of the present invention will be described in detail with reference to accompanying illustrative drawings. Such drawings correspond to one embodiment for describing the present invention, may be implemented in various different forms, and are not limited to the present specification.

In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

It should be understood that the terms used in the specification and the appended claims should not be construed as limited to general and dictionary meanings, but interpreted based on the meanings and concepts corresponding to technical aspects of the present disclosure based on the principle that the inventor is allowed to define terms.

The term "composite" used in the present specification denotes a material exhibiting a more effective function while two or more materials are combined to form a physically and chemically different phase.

Lithium-Sulfur battery uses sulfur as a positive electrode active material and lithium metal as a negative electrode active material. When the Lithium-Sulfur battery is discharged, the oxidation reaction of lithium occurs in the negative electrode, and the reduction reaction of sulfur occurs in the positive electrode. At this time, the reduced sulfur is converted into lithium polysulfide by binding with lithium ions transferred from the negative electrode, and eventually accompanies a reaction to form lithium sulfide.

The Lithium-Sulfur battery has much higher theoretical energy density than the conventional lithium secondary battery, and has an advantage that it can lower the manufacturing cost of the battery because the sulfur used as a positive electrode active material positive electrode active material is low in price due to its abundance in resources. Therefore, the Lithium-Sulfur battery is attracting attention as a next-generation battery.

Despite this advantage, due to the low electrical conductivity and the lithium ion conductivity of the sulfur, a positive electrode active material, it is difficult to realize all of the theoretical energy density in actual operation.

In order to improve the electrical conductivity of the sulfur, methods such as forming a composite with a conductive material, for example, carbon, polymer and the like, and coating are used. Among the various methods, a sulfur-carbon composite is most commonly used as a positive electrode active material because it is effective in improving the electrical conductivity of the positive electrode, but it is still insufficient in terms of charge/discharge capacity and efficiency. Capacity and efficiency of the Lithium-Sulfur battery may vary depending on the amount of the lithium ion delivered to the positive electrode. Accordingly, for the high capacity and high efficiency of the battery, it is important to make the transfer of the lithium ion into the sulfur-carbon composite easy.

Method for Preparing Sulfur-Carbon Composite

Accordingly, in order to secure the effect of improving reactivity between a sulfur-carbon composite and electrolyte, and capacity and efficiency characteristics of a Lithium-Sulfur battery, the present invention provides a method for preparing a sulfur-carbon composite wherein sulfur in the β-monoclinic sulfur phase is deposited in a sulfur-carbon composite.

First, the method for preparing a sulfur-carbon composite according to the first embodiment of the present invention comprises the following steps of (a) stirring a porous carbon material in a solvent mixture including a carbonate compound and a volatile solvent, and then drying; and (b) mixing the porous carbon material produced in (a) with sulfur and then depositing the sulfur on a portion of a surface of and inside a portion of pores of the porous carbon material by subjecting the mixture to a heat melting method.

The method for preparing a sulfur-carbon composite according to the first embodiment of the present invention comprises the step (a) of stirring a porous carbon material in a solvent mixture of a carbonate-based compound and a volatile solvent, and then drying thereof.

The porous carbon material provides a skeleton to which the sulfur, a positive electrode active material, can be uniformly and stably fixed, and compensates the electrical conductivity of the sulfur so as to make the electrochemical reaction proceed smoothly.

In general, the porous carbon material can be prepared by carbonizing precursors of various carbon materials. The porous carbon material may include non-uniform pores therein, wherein the average diameter of the pores is in the range of 1 nm to 200 nm, and the porosity or void fraction may be in the range of 10% to 90% of the total volume of the porous carbon material. If the average diameter of the pores is less than the above range, the pore size is only a molecular level and therefore, it may be difficult to impregnate the sulfur. On the contrary, if the average diameter of the pores is over the range, the mechanical strength of the porous carbon is weakened and therefore, it may not be preferable for application to an electrode manufacturing process.

The porous carbon material may be spherical, rod-like, needle-like plate-like, tube-like or bulky form without limitation as long as it is commonly used in a Lithium-Sulfur battery.

The porous carbon material may be a porous structure or a material having high specific surface area as long as it is commonly used in the art. For example, the porous carbon material may be at least one selected from the group consisting of graphite; graphene; carbon black such as denka black, acetylene black, ketjen black, channel black, furnace black, lamp black and summer black; carbon nanotube (CNT) such as single-wall carbon nanotube (SWCNT) and multi-wall carbon nanotube (MWCNT); carbon fiber such as graphite nanofiber (GNF), carbon nanofiber (CNF) and activated carbon fiber (ACF); and activated carbon, but not limited thereto.

In the method for preparing a sulfur-carbon composite according to the first embodiment of the present invention, in the step (a), the surface of the porous carbon material can be modified by stirring the porous carbon material in a solvent mixture of a carbonate-based compound and a volatile solvent. Through this, the sulfur in the β-monoclinic sulfur phase can be deposited on the surface of the porous carbon material later.

The carbonate compound may be at least one selected from the group consisting of propylene carbonate, methylene carbonate, ethylene carbonate and butylene carbonate.

The volatile solvent may be one having a low boiling point and a low solubility for the sulfur, and specifically, it may be at least one selected from the group consisting of ethanol and tetrahydrofuran (THF).

The solvent mixture of a carbonate compound and a volatile solvent may contain the carbonate compound in an amount of 0.1 wt % to 10 wt % based on the total mixed solvent mixture. If the content of the carbonate compound exceeds 10 wt %, the compound may elute from the inside of the composite and then transfer to the lithium negative electrode, thereby causing early degradation of the cell due to side reaction with lithium, and if the content is less than 0.1 wt %, there may be a problem that the effect by containing carbonate does not appear.

The stirring process can be conducted by the conventional method in the art, preferably by a mortar.

Further, in the step (a), the stirred sulfur-carbon composite can be dried. The drying method may be a general method used in the art, and preferably, the drying may be conducted at 70° C. to 150° C. for 15 min to 1 hr.

Then, the method for preparing a sulfur-carbon composite according to the first embodiment of the present invention comprises the step (b) of mixing the porous carbon material with sulfur and then depositing the sulfur by a heat melting method.

When the sulfur is deposited by the heat melting method in the step (b), heat treatment for the heat melting method can be carried out according to the conventional method in the art, and preferably the heat melting may be performed at 130° C. to 180° C. for 10 min to 1 hr.

The sulfur may be at least one selected from the group consisting of inorganic sulfur ($S_8$), $Li_2S_n (n \geq 1)$, organic sulfur compound and carbon-sulfur polymer [$(C_2S_x)_n$, x=2.5 to 50, n≥2]. Preferably, inorganic sulfur ($S_8$) may be used.

In the sulfur-carbon composite according to the present invention, a weight ratio of the sulfur and the porous carbon material may be 9:1 to 5:5, preferably 8:2 to 7:3. If the weight ratio is less than the above range, the amount of a binder required for preparing the positive electrode slurry may be increased as the content of the porous carbon material is increased. The increased in the amount of a binder eventually increases the sheet resistance of the electrode, and acts as an insulator to block the electron pass, thereby deteriorating cell performance. On the contrary, if ratio is over the range, sulfurs are aggregated each other and may be difficult to receive electrons, thereby making it difficult to participate directly in electrode reaction.

Further, the sulfur is located on the surface as well as inside of the pores of the porous carbon material, and at this time, it may be present in an area of less than 100%, preferably 1% to 95%, and more preferably 60% to 90% of the entire outer surface of the porous carbon material. When the sulfur is present on the surface of the porous carbon material within the above range, it can exhibit the maximum effect in terms of the electron transfer area and the wettability of the electrolyte. Specifically, since the sulfur is impregnated thinly and evenly on the surface of the porous carbon material within the above range, the electron transfer contact area can be increased in the charging and discharging process. If the sulfur is located in the 100% region of the surface of the porous carbon material, the porous carbon material is completely covered with the sulfur. Therefore, since the wettability of the electrolyte may be lowered and the contact with the conductive material contained in the electrode is decreased, the electrode cannot receive electrons and therefore, it cannot participate in the reaction.

The sulfur-carbon composite can carry sulfur in a high content due to three-dimensionally interconnected and regularly arranged pores having various sizes in the structure. This can lead to the formation of soluble polysulfide by an electrochemical reaction, but it can also be located inside the sulfur-carbon composite. Therefore, when the polysulfide is eluted, a three-dimensionally entangled structure is maintained, thereby suppressing the collapse of a positive electrode structure. As a result, the Lithium-Sulfur battery including the sulfur-carbon composite has an advantage that a high capacity can be realized even at high loading. The loading amount of the sulfur in the sulfur-carbon composite according to the present invention may be 1 $mg/cm^2$ to 20 $mg/cm^2$.

In the step (b), when mixing the sulfur and the porous carbon material, a weight ratio of the sulfur and the porous carbon material may be 9:1 to 5:5, preferably 8:2 to 7:3. If the weight ratio is less than the above range, the amount of the binder required for preparing positive electrode slurry is increased as the content of the porous carbon material is increased. The increase in the amount of the binder eventually increases the sheet resistance of the electrode, and acts as an insulator to block the electron pass, thereby deteriorating the cell performance. On the contrary, if the weight ratio is over the above range, sulfurs are aggregated each other and may be difficult to receive electrons, thereby making it difficult to participate directly in electrode.

The sulfur-carbon composite of the present invention prepared by the method mentioned above contains sulfur in the β-monoclinic sulfur phase. According to the conventional invention, when the sulfur was just melt-diffused in the carbon material, only phases with orthorhombic structure were observed by XRD analysis. However, according to the preparation method of the present invention, when melt-diffusion is performed using the carbonate-based compound as a dopant the sulfur is converted into a β-monoclinic sulfur phase, and a proportion of the sulfur converted into the β-monoclinic sulfur phase in the sulfur-carbon composite may be 90% or more, preferably 95% or more, more preferably 99% or more, based on a total molar ratio of the sulfur. Most preferably, all of the sulfur may be converted.

Thus, in the present invention, the porous carbon material is stirred in a solvent mixture of a carbonate-based compound and a volatile solvent to modify the surface of the porous carbon material, and then the porous carbon material is heat-treated to deposit the sulfur. Therefore, through the deposition of the sulfur on the surface of the porous carbon material, it is possible to deposit the sulfur having the form of the β-monoclinic sulfur phase onto the porous carbon material.

First, the method for preparing a sulfur-carbon composite according to the second embodiment of the present invention comprises the following steps of (a) mixing and stirring a porous carbon material and sulfur in a solvent mixture including a carbonate-based compound and a volatile solvent, and then drying; and (b) depositing the sulfur on a portion of a surface of and inside a portion of pores of the porous carbon material by subjecting the resulting mixture of (a) to a heat melting method.

The method for preparing a sulfur-carbon composite according to the second embodiment of the present invention comprises the step (a) mixing and stirring a porous carbon material and sulfur in a solvent mixture of a carbonate-based compound and a volatile solvent, and then drying thereof.

The porous carbon material provides a skeleton to which the sulfur, a positive electrode active material, can be uniformly and stably fixed, and compensates the electrical conductivity of the sulfur so as to make the electrochemical reaction proceed smoothly.

In general, the porous carbon material can be prepared by carbonizing precursors of various carbon materials. The porous carbon material may include non-uniform pores therein, wherein the average diameter of the pores is in the range of 1 nm to 200 nm, and the porosity or void fraction may be in the range of 10% to 90% of the total volume of the porous carbon material. If the average diameter of the pores is less than the above range, the pore size is only a molecular level and therefore, it may be difficult to impregnate the sulfur. On the contrary, if the average diameter of the pores is over the range, the mechanical strength of the porous carbon is weakened and therefore, it may not be preferable for application to an electrode manufacturing process.

The porous carbon material may be spherical, rod-like, needle-like plate-like, tube-like or bulky form without limitation as long as it is commonly used in a Lithium-Sulfur battery.

The porous carbon material may be a porous structure or a material having high specific surface area as long as it is commonly used in the art. For example, the porous carbon material may be at least one selected from the group consisting of graphite; graphene; carbon black such as denka black, acetylene black, ketjen black, channel black, furnace black, lamp black and summer black; carbon nanotube (CNT) such as single-wall carbon nanotube (SWCNT) and multi-wall carbon nanotube (MWCNT); carbon fiber such as graphite nanofiber (GNF), carbon nanofiber (CNF) and activated carbon fiber (ACF); and activated carbon, but not limited thereto.

The sulfur may be at least one selected from the group consisting of inorganic sulfur ($S_8$), $Li_2S_n(n\geq1)$, organic sulfur compound and carbon-sulfur polymer [$(C_2S_x)_n$, x=2.5 to 50, n≥2]. Preferably, inorganic sulfur ($S_8$) may be used.

In the sulfur-carbon composite according to the present invention, a weight ratio of the sulfur and the porous carbon material may be 9:1 to 5:5, preferably 8:2 to 7:3. If the weight ratio is less than the above range, the amount of the binder required for preparing positive electrode slurry is increased as the content of the porous carbon material is increased. The increase in the amount of the binder eventually increases the sheet resistance of the electrode, and acts as an insulator to block the electron pass, thereby deteriorating the cell performance. On the contrary, if the weight ratio is over the above range, sulfurs are aggregated each other and may be difficult to receive electrons, thereby making it difficult to participate directly in electrode.

Further, the sulfur is located on the surface as well as inside of the pores of the porous carbon material, and at this time, it may be present in an area of less than 100%, preferably 1% to 95%, and more preferably 60% to 90% of the entire outer surface of the porous carbon material. When the sulfur is present on the surface of the porous carbon material within the above range, it can exhibit the maximum effect in terms of the electron transfer area and the wettability of the electrolyte. Specifically, since the sulfur is impregnated thinly and evenly on the surface of the porous carbon material within the above range, the electron transfer contact area can be increased in the charging and discharging process. If the sulfur is located in the 100% region of the surface of the porous carbon material, the porous carbon material is completely covered with the sulfur. Therefore, since the wettability of the electrolyte may be lowered and the contact with the conductive material contained in the electrode is decreased, the electrode cannot receive electrons and therefore, it cannot participate in the reaction.

The sulfur-carbon composite can carry sulfur in a high content due to three-dimensionally interconnected and regularly arranged pores having various sizes in the structure. This can lead to the formation of soluble polysulfide by an electrochemical reaction, but it can also be located inside the sulfur-carbon composite. Therefore, when the polysulfide is eluted, a three-dimensionally entangled structure is maintained, thereby suppressing the collapse of a positive electrode structure. As a result, the Lithium-Sulfur battery including the sulfur-carbon composite has an advantage that a high capacity can be realized even at high loading. The loading amount of the sulfur in the sulfur-carbon composite according to the present invention may be 1 $mg/cm^2$ to 20 $mg/cm^2$.

In the step (a), when mixing the sulfur and the porous carbon material, a weight ratio of the sulfur and the porous carbon material may be 9:1 to 5:5, preferably 8:2 to 7:3. If the weight ratio is less than the above range, the amount of the binder required for preparing positive electrode slurry is increased as the content of the porous carbon material is increased. The increase in the amount of the binder eventually increases the sheet resistance of the electrode, and acts as an insulator to block the electron pass, thereby deteriorating the cell performance. On the contrary, if the weight ratio is over the above range, sulfurs are aggregated each other and may be difficult to receive electrons, thereby making it difficult to participate directly in electrode.

In the method for preparing a sulfur-carbon composite according to the second embodiment of the present invention, in the step (a), the surface of the porous carbon material can be modified by stirring the porous carbon material in a solvent mixture of a carbonate-based compound and a volatile solvent. Through this, the sulfur in the β-monoclinic sulfur phase can be deposited on the surface of the porous carbon material later.

The carbonate compound may be at least one selected from the group consisting of propylene carbonate, methylene carbonate, ethylene carbonate and butylene carbonate.

The volatile solvent may be one having a low boiling point and a low solubility for the sulfur, and specifically, it may be at least one selected from the group consisting of ethanol and tetrahydrofuran (THF).

The solvent mixture of a carbonate compound and a volatile solvent may contain the carbonate compound in an amount of 0.1 wt % to 10 wt % based on the total solvent mixture. If the content of the carbonate compound exceeds 10 wt %, the compound may elute from the inside of the composite and then transfer to the lithium negative electrode, thereby causing early degradation of the cell due to side reaction with lithium, and if the content is less than 0.1 wt %, there may be a problem that the effect by containing carbonate does not appear.

The stirring process can be conducted by the conventional method in the art, preferably by a mortar.

Further, in the step (a), the stirred sulfur-carbon composite may be dried. The drying method may be a general method used in the art, and preferably, the drying may be conducted at 70° C. to 150° C. for 15 min to 1 hr.

Then, the method for preparing a sulfur-carbon composite according to the second embodiment of the present invention comprises the step (b) of depositing the sulfur in the porous carbon material by a heat melting method.

When the sulfur is deposited by the heat melting method in the step (b), heat treatment for the heat melting method can be carried out according to the conventional method in the art, and preferably the heat melting may be performed at 130° C. to 180° C. for 10 min to 1 hr.

The sulfur-carbon composite of the present invention prepared by the method mentioned above contains sulfur in the β-monoclinic sulfur phase. According to the conventional invention, when the sulfur was just melt-diffused in the carbon material, only phases with orthorhombic structure were observed by XRD analysis. However, according to the preparation method of the present invention, when melt-diffusion is performed using the carbonate-based compound as a dopant the sulfur is converted into a β-monoclinic sulfur phase, and a proportion of the sulfur converted into the β-monoclinic sulfur phase in the sulfur-carbon composite may be 90% or more, preferably 95% or more, most preferably 99% or more, based on a total molar ratio of the sulfur.

Thus, in the present invention, the porous carbon material is stirred in a solvent mixture of a carbonate-based compound and a volatile solvent to modify the surface of the porous carbon material, and then the porous carbon material is heat-treated to deposit the sulfur. Therefore, through the deposition of the sulfur on the surface of the porous carbon material, it is possible to deposit the sulfur having the form of the β-monoclinic sulfur phase onto the porous carbon material.

Sulfur-Carbon Composite

In the method of preparing the sulfur-carbon composite of the present invention, a carbonate-based compound is used as a dopant and is melt diffused. Accordingly, the phase of the sulfur contained in at least one of the inner and outer surfaces of the porous carbon material of the sulfur-carbon composite is converted into the β-monoclinic sulfur phase, and therefore, the sulfur-carbon composite of the invention contains sulfur in the β-monoclinic sulfur phase.

The sulfur-carbon composite of the present invention comprises a porous carbon material; and sulfur in at least a part of the inside and the surface of the porous carbon material.

The porous carbon material provides a skeleton to which the sulfur, a positive electrode active material, can be uniformly and stably fixed, and compensates the electrical conductivity of the sulfur so as to make the electrochemical reaction proceed smoothly.

In general, the porous carbon material can be prepared by carbonizing precursors of various carbon materials. The porous carbon material may include non-uniform pores therein, wherein the average diameter of the pores is in the range of 1 nm to 200 nm, and the porosity or void fraction may be in the range of 10% to 90% of the total volume of the porous space. If the average diameter of the pores is less than the above range, the pore size is only a molecular level and therefore, it may be difficult to impregnate the sulfur. On the contrary, if the average diameter of the pores is over the range, the mechanical strength of the porous carbon is weakened and therefore, it may not be preferable for application to an electrode manufacturing process.

The porous carbon material may be spherical, rod-like, needle-like plate-like, tube-like or bulky form without limitation as long as it is commonly used in a Lithium-Sulfur battery.

The porous carbon material may be a porous structure or a material having high specific surface area as long as it is commonly used in the art. For example, the porous carbon material may be at least one selected from the group consisting of graphite; graphene; carbon black such as denka black, acetylene black, ketjen black, channel black, furnace black, lamp black and summer black; carbon nanotube (CNT) such as single-wall carbon nanotube (SWCNT) and multi-wall carbon nanotube (MWCNT); carbon fiber such as graphite nanofiber (GNF), carbon nanofiber (CNF) and activated carbon fiber (ACF); and activated carbon, but not limited thereto.

The sulfur may be at least one selected from the group consisting of inorganic sulfur ($S_8$), $Li_2S_n$(n≥1), organic sulfur compound and carbon-sulfur polymer [$(C_2S_x)_n$, x=2.5 to 50, n≥2]. Preferably, inorganic sulfur ($S_8$) may be used.

In the sulfur-carbon composite according to the present invention, a weight ratio of the sulfur and the porous carbon material may be 9:1 to 5:5, preferably 8:2 to 7:3. If the weight ratio is less than the above range, the amount of the binder required for preparing positive electrode slurry is increased as the content of the porous carbon material is increased. The increase in the amount of the binder eventually increases the sheet resistance of the electrode, and acts as an insulator to block the electron pass, thereby deteriorating the cell performance. On the contrary, if the weight ratio is over the above range, sulfurs are aggregated each other and may be difficult to receive electrons, thereby making it difficult to participate directly in electrode.

Further, the sulfur is located on the surface as well as inside of the pores of the porous carbon material, and at this time, it may be present in an area of less than 100%, preferably 1% to 95%, and more preferably 60% to 90% of the entire outer surface of the porous carbon material. When the sulfur is present on the surface of the porous carbon material within the above range, it can exhibit the maximum effect in terms of the electron transfer area and the wettability of the electrolyte. Specifically, since the sulfur is impregnated thinly and evenly on the surface of the porous carbon material within the above range, the electron transfer contact area can be increased in the charging and discharging process. If the sulfur is located in the 100% region of the surface of the porous carbon material, the porous carbon material is completely covered with the sulfur. Therefore, since the wettability of the electrolyte may be lowered and the contact with the conductive material contained in the electrode is decreased, the electrode cannot receive electrons and therefore, it cannot participate in the reaction.

According to the conventional invention, when the sulfur was just melt-diffused in the carbon material, only phases with orthorhombic structure were observed by XRD analysis. However, according to the preparation method of the present invention, when melt-diffusion is performed using the carbonate-based compound as a dopant the sulfur is converted into a β-monoclinic sulfur phase, and the ratio of the sulfur converted into the β-monoclinic sulfur phase in the sulfur-carbon composite may be 90% or more, preferably 95% or more, more preferably 99% or more, based on the total molar ratio of the sulfur. Most preferably, all of the sulfur may be converted.

The sulfur-carbon composite can carry sulfur in a high content due to three-dimensionally interconnected and regularly arranged pores having various sizes in the structure. This can lead to the formation of soluble polysulfide by an electrochemical reaction, but it can also be located inside the sulfur-carbon composite. Therefore, when the polysulfide is eluted, a three-dimensionally entangled structure is maintained, thereby suppressing the collapse of a positive electrode structure. As a result, the Lithium-Sulfur battery including the sulfur-carbon composite has an advantage that a high capacity can be realized even at high loading. The loading amount of the sulfur in the sulfur-carbon composite according to the present invention may be 1 mg/cm$^2$ to 20 mg/cm$^2$.

Positive Electrode for Lithium-Sulfur Battery

The sulfur-carbon composite proposed in the present invention can be preferably used as a positive electrode active material for a Lithium-Sulfur battery.

The positive electrode is manufactured by coating a composition for forming a positive electrode active material layer on a positive electrode current collector and then drying thereof. The composition for forming a positive electrode active material layer is prepared by mixing the above-described sulfur-carbon composite with a conductive material and a binder and then drying thereof at 40° C. to 70° C. for 4 hr to 12 hr.

Specifically, in order to give an additional conductivity to the sulfur-carbon composite thus manufactured, a conductive material can be added to the positive electrode composition. The conductive material plays a role in allowing electrons to move smoothly in the positive electrode. The conductive material is not particularly limited as long as it does not cause chemical change in the battery and can provide an excellent conductivity and a large surface area, but preferably, it may be a carbon-based material.

The carbon-based material may be at least one selected from graphites such as natural graphite, artificial graphite, expanded graphite and graphene; active carbons; carbon blacks such as channel black, furnace black, thermal black, contact black, lamp black and acetylene black; carbon fibers; carbon nanostructures such as carbon nanotube (CNT) and fullerene; and a combination thereof.

Besides the carbon-based material, according to purpose, metallic fiber such as metal mesh; metallic powder such as copper (Cu), silver (Ag), nickel (Ni) and aluminum (Al); or an organic conductive material such as polyphenylene derivatives can also be used. The conductive materials can be used alone or in combination.

Further, in order to provide the positive electrode active material with adhesion to the current collector, the positive electrode composition may further comprise a binder. The binder must be well dissolved in a solvent, must well construct the conductive network between the positive electrode active material and the conductive material, and also have adequate impregnation of the electrolyte.

The binder applicable to the present invention may be any binder known in the art. Specifically, the binder may be at least one selected from the group consisting of fluorine resin-based binder such as polyvinylidene fluoride (PVdF) and polytetrafluoroethylene (PTFE); rubber-based binder such as styrene-butadiene rubber, acrylonitrile-butadiene rubber and styrene-isoprene rubber; cellulose-based binder such as carboxymethylcellulose (CMC), starch, hydroxypropylcellulose and regenerated cellulose; polyalcohol-based binder; polyolefin-based binder such as polyethylene and polypropylene; polyimide-based binder; polyester-based binder; and silane-based binders; or a mixture or copolymer thereof, but not limited thereto.

The amount of the binder resin may be 0.5 wt % to 30 wt % based on the total weight of the positive electrode for a Lithium-Sulfur battery, but not limited thereto. If the amount of the binder resin is less than 0.5 wt %, physical properties of the positive electrode may be deteriorated and the positive electrode active material and the conductive material may be separated, and if the amount is over 30 wt %, the ratio of the active material to the conductive material in the positive electrode may be relatively reduced and the battery capacity may be reduced.

Solvent for preparing the positive electrode composition for a Lithium-Sulfur battery in a slurry state should be easy to dry and can dissolve the binder well, but keep the positive electrode active material and the conductive material in a dispersed state without dissolving, most preferably. When the solvent dissolves the positive electrode active material, because the specific gravity of the sulfur in the slurry is high (D=2.07), the sulfur is submerged in the slurry and then the sulfur is driven to the current collector during coating. Thus, there is a tendency that there is a problem on the conductive network, thereby causing a problem on the battery operation.

The solvent according to the present invention may be water or organic solvent, and the organic solvent may be at least one selected from the group consisting of dimethyl formaldehyde, isopropyl alcohol, acetonitrile, methanol, ethanol and tetrahydrofuran.

The mixing of the positive electrode composition may be conducted by a common stirring method using a common mixer, for example, a paste mixer, a high speed shear mixer, a homomixer and the like.

The positive electrode for a Lithium-Sulfur battery can be formed by coating the positive electrode composition on the current collector and then vacuum drying thereof. The slurry may be coated on the current collector with an appropriate thickness according to the viscosity of the slurry and the thickness of the positive electrode to be formed, and the thickness may be suitably selected within the range of 10 μm to 300 μm.

At this time, there is no limitation on the method of coating the slurry. For example, the slurry may be coated by the following methods: Doctor blade coating, Dip coating, Gravure coating, Slit die coating, Spin coating, Comma coating, Bar coating, Reverse roll coating, Screen coating, Cap coating and the like.

The positive electrode current collector is not particularly limited as long as it can be formed to the thickness of 3 μm to 500 μm and has high conductivity without causing chemical change to the battery. For example, it may be a conductive metal such as stainless steel, aluminum, copper and titanium, preferably aluminum current collector. Such positive electrode current collector may be in various forms such as film, sheet, foil, net, porous body, foam and non-woven fabric.

Lithium-Sulfur Battery

In one embodiment of the present invention, the Lithium-Sulfur battery may comprise: the above described positive electrode for a Lithium-Sulfur battery; a negative electrode containing lithium metal or lithium alloy as a negative electrode active material; a separator interposed between the positive electrode and the negative electrode; and electrolyte which is impregnated in the negative electrode, the positive electrode and the separator and contains lithium salt and organic solvent.

The negative electrode may use a material that can reversibly intercalate or deintercalate lithium ions ($Li^+$), a material that can reversibly form a lithium-containing compound by reacting with lithium ions, lithium metal or lithium alloy, as a negative electrode active material. The material that can reversibly intercalate or deintercalate the lithium ions may be, for example, crystalline carbon, amorphous carbon and a mixture thereof. The material that can reversibly form a lithium-containing compound by reacting with lithium ions may be, for example, tin oxide (SnO2), titanium nitrate or silicon (Si). The lithium alloy may be an alloy of lithium and a metal selected from the group consisting of Na, K, Rb, Cs, Fr, Be, Mg, Ca, Sr, Ba, Ra, Al and Sn.

Further, in the process of charging or discharging a lithium-sulfur battery, sulfur used as the positive electrode active material may be converted into an inactive material and may adhere to the surface of the lithium negative electrode. Like this, inactive sulfur refers to sulfur that has undergone various electrochemical or chemical reactions and can no longer participate in electrochemical reactions of the positive electrode. The inactive sulfur formed on the surface of the lithium negative electrode has an advantage that it can serve as a protective layer of the lithium negative electrode. Therefore, a lithium metal and inactive sulfur (e.g., lithium sulfide) formed on the lithium metal can be used as the negative electrode.

Besides the negative electrode active material, the negative electrode of the present invention may further comprise a pretreatment layer made of a lithium ion conductive material and a lithium metal protecting layer formed on the pretreatment layer.

The separator interposed between the positive electrode and the negative electrode separator is capable of separating or isolating the positive electrode and the negative electrode, and transporting lithium ions between the positive electrode and the negative electrode, and may be composed of a porous non-conductive or insulating material. Such separator may be an independent member such as a thin membrane or film as an insulator having high ion permeability and mechanical strength, and may be a coating layer added to the positive electrode and/or the negative electrode. Further, when solid electrolyte such as a polymer is used as electrolyte, the solid electrolyte may also serve as a separator.

Generally, the separator may have a pore diameter of 0.01 μm to 10 μm and a thickness of 5 μm to 300 μm preferably, and such separator may be glass electrolyte, polymer electrolyte or ceramic electrolyte. For example, as the separator, sheets or non-woven fabrics, made of an olefin-based polymer such as polypropylene or glass fibers or polyethylene, which have chemical resistance and hydrophobicity, or Kraft paper is used. Examples of commercially available separators include Celgard series (Celgard® 2400, product of 2300 Hoechest Celanese Corp.), polypropylene separators (product of Ube Industries Ltd. or product of Pall RAI), polyethylene series (Tonen or Entek) and the like.

The solid electrolyte separator may contain a non-aqueous organic solvent in an amount of less than about 20 wt %. In this case, the solid electrolyte may further contain an appropriate gelling agent in order to reduce the fluidity of the organic solvent. Representative examples of such gelling agent may include polyethyleneoxide, polyvinylidene fluoride, polyacrylonitrile and the like.

The electrolyte impregnated in the negative electrode, the positive electrode and the separator may be a lithium salt-containing non-aqueous electrolyte, composed of a lithium salt and electrolyte. The electrolyte may be non-aqueous organic solvent, organic solid electrolyte and inorganic solid electrolyte.

The lithium salt of the present invention is a material that is well dissolved in the non-aqueous organic solvent and examples thereof include at least one selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN$ $(CF_3SO_2)_2$, $LiN(C_2F_5SO_2)_2$, $LiN(SFO_2)_2$, $LiN(CF_3CF_2SO_2)_2$, chloroborane lithium, lower aliphatic carboxylic acid lithium, lithium tetraphenyl borate, lithium imide and a combination thereof.

The concentration of the lithium salt may be 0.2 M to 2.0 M, specifically 0.6 M to 2 M, more specifically 0.7 M to 1.7 M according to various factors such as the exact composition of the electrolyte mixture, the solubility of the salt, the conductivity of the dissolved salt, charge and discharge conditions of the battery, working temperature and other factors publicly known in the lithium battery field. If the salt is used at the concentration of less than 0.2 M, the conductivity of the electrolyte may be lowered and the electrolyte performance may be deteriorated, and if the salt is used at the concentration more than 2 M, the viscosity of the electrolyte may be increased and the mobility of lithium ion ($Li^+$) may be reduced.

The non-aqueous organic solvent should well dissolve the lithium salt, and the non-aqueous organic solvent of the present invention may be, for example, non-protic organic solvent such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethyoxy ethane, tetrahydroxy franc, 2-methyl tetrahydrofuran, dimethyl sulfoxide, 1,3-dioxolane, 4-methyl-1,3-dioxane, diethyl ether, formamide, dimethyl formamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate, and the organic solvent may be used alone or in combination of two or more.

The organic solid electrolyte may be, for example, polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

The inorganic solid electrolyte may be, for example, nitrides, halides and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

In order to improve charge/discharge characteristics and flame retardancy, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like may be added to the electrolyte of the present invention. If necessary, in order to give incombustibility, halogen-containing solvents such as carbon tetrachloride and ethylene trifluoride may be further added thereto, and in order to improve high-temperature storage characteristics, carbon dioxide gas, Fluoro-ethylene carbonate (FEC), Propene sultone (PRS), Fluoro-propylene carbonate (FPC) and the like may be further added thereto.

The electrolyte may be used as a liquid electrolyte or a solid electrolyte separator. When used as a liquid electrolyte, the electrolyte further includes a separator that is a physical separator for physically separating electrodes and may be made of porous glass, plastic, ceramic or polymer.

Hereinafter, the preferred embodiment of the present invention will be described in detail based on examples. However, the embodiments of the present invention may be modified in various ways, and the scope of the present invention should not be interpreted as being limited to the examples. The embodiments of the present invention are provided just for explaining the present invention more perfectly to those having ordinary skill in the art.

Preparation of Sulfur-Carbon Composite

Example 1

Propylene carbonate 0.3 g and ethanol 6 g were mixed to prepare a solvent. Then, carbon nanotube 0.5 g was mixed to the solvent. The resulting mixture was stirred for 15 min with a mortar and then dried in a 110° C. oven for 30 min. The dried carbon nanotube and sulfur 1.5 g were mixed with a mortar, and then melt diffused at 155° C. for 30 min to prepare a sulfur-carbon composite.

Example 2

Propylene carbonate 0.3 g and ethanol 6 g were mixed to prepare a solvent. Then, carbon nanotube 0.5 g and sulfur 1.5 g were mixed to the solvent, and then the resulting mixture was stirred for 15 min with a mortar. Then, the dried carbon nanotube was mixed with a mortar, and then melt diffused at 155° C. for 30 min to prepare a sulfur-carbon composite.

Comparative Example 1

Carbon nanotube and sulfur 1.5 g were mixed with a mortar, and then melt diffused at 155° C. for 30 min to prepare a sulfur-carbon composite.

Using the sulfur-carbon composite prepared in Example 1, slurry was prepared at a weight ratio of sulfur-carbon composite:conductive material:binder=90:5:5, and then the slurry was coated on a 20 μm-thick aluminum foil current collector to manufacture an electrode. At this time, carbon black was used as a conductive material, and styrene butadiene rubber and carboxymethyl cellulose were used as a binder. The electrode thus manufactured was dried in a 50° C. oven overnight to manufacture a positive electrode for a Lithium-Sulfur battery.

Test Example 1

Result of Thermogravimetric Analysis (TGA) for Sulfur-Carbon Composite

For the sulfur-carbon composites prepared in Example 1, Example 2 and Comparative Example 1, thermogravimetric analysis (TGA, Mettler-Toledo, TGA2) was conducted. The results are shown in FIG. 1, and more enlarged results are shown in FIG. 2.

Figure 1:
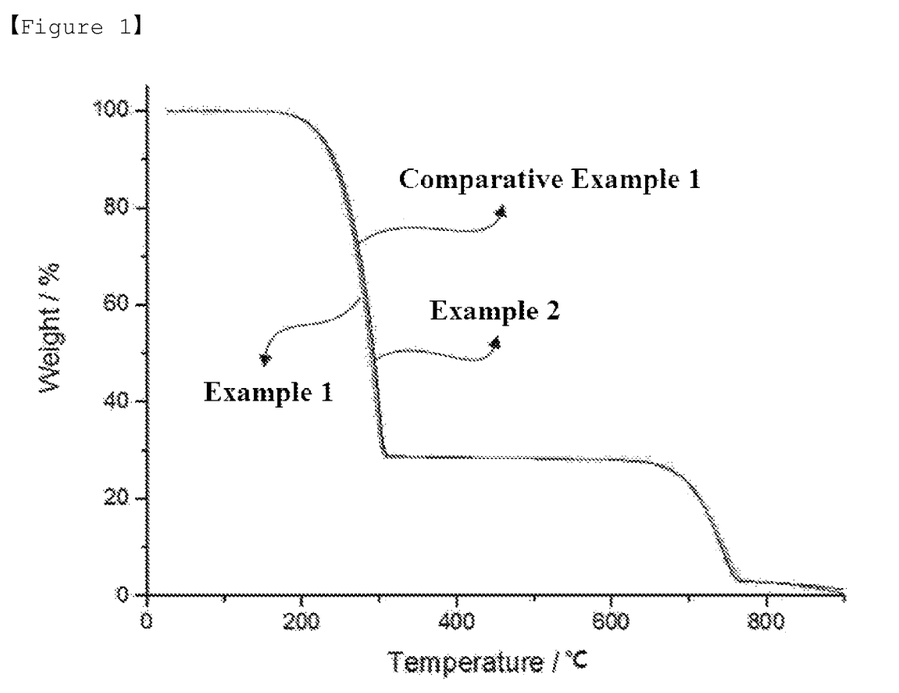
FIGS. 1 and 2 are graphs showing the results of thermogravimetric analysis of the sulfur-carbon composites according to Examples and Comparative Example of the present invention.
Figure 2:
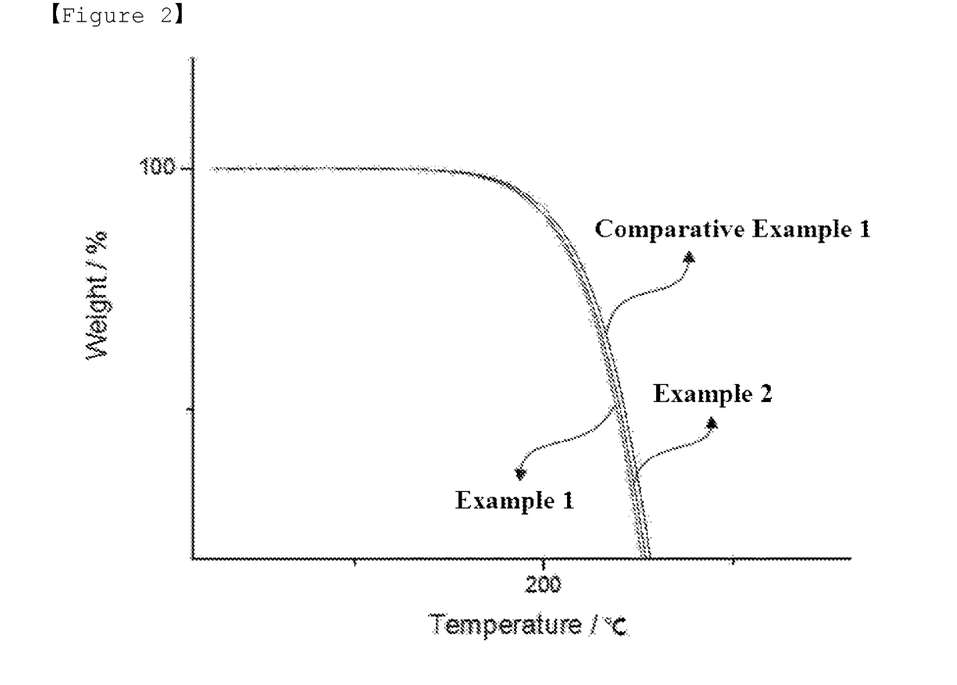

As shown in FIG. 1 and FIG. 2, it can be found that in the case of the sulfur-carbon composites prepared in Example 1 and Example 2, which contain sulfur, only phase was changed without loss of any components.

Test Example 2

Result of X-Ray Diffraction Spectroscopy (XRD) for Sulfur-Carbon Composite

Figure 3:
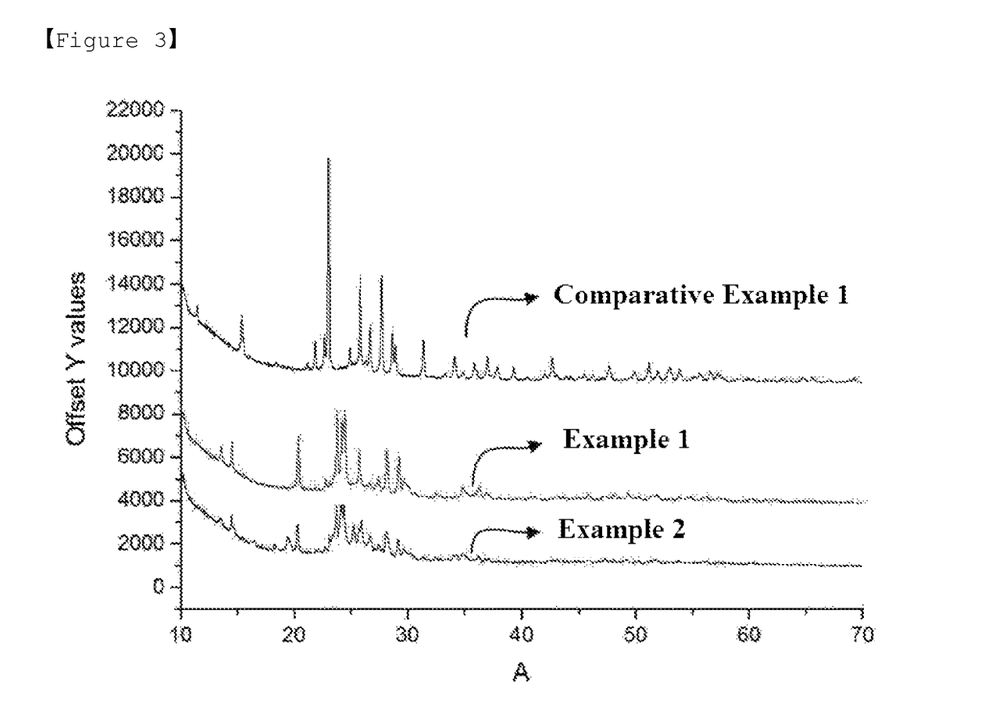
FIG. 3 is a graph showing the results of XRD analysis of the sulfur-carbon composites according to Examples and Comparative Example of the present invention.

For the sulfur-carbon composites prepared in Example 1, Example 2 and Comparative Example 1, X-ray Diffraction Spectroscopy (Mettler-Toledo, TGA2) was conducted, and the results are shown in FIG. 3.

As shown in FIG. 3, it can be found that the phase of the sulfur contained in the sulfur-carbon composite prepared in Example 1 was all converted into the β-monoclinic sulfur phase, and the phase of the sulfur contained in the sulfur-carbon composite prepared in Example 2 also contained β-monoclinic sulfur phase. But, it can be found that the phase of the sulfur contained in the sulfur-carbon composite prepared in Comparative Example 1 was only orthorhombic phase without β-monoclinic sulfur phase.

Test Example 3

Battery Performance Evaluation

Using the sulfur-carbon composite prepared in Example 1, Example 2 and Comparative Example 1, slurry was prepared at a weight ratio of sulfur-carbon composite:conductive material:binder=90:5:5, and then the slurry was coated on a 20 μm-thick aluminum foil current collector to manufacture an electrode. At this time, carbon black was used as a conductive material, and styrene butadiene rubber and carboxymethyl cellulose were used as a binder. The electrode thus manufactured was dried in a 50° C. oven overnight to manufacture a positive electrode for a Lithium-Sulfur battery.

The positive electrode for a Lithium-Sulfur battery as a positive electrode, polyethylene as a separator and a 50 μm-thick aluminum foil as a negative electrode were used to manufacture a Lithium-Sulfur battery coin cell. At this time, the coin cell used electrolyte that was prepared by dissolving 1 M LiFSI, 1% LiNO$_3$ in an organic solvent mixture of diethylene glycol dimethyl ether and 1,3-dioxolane (DECDME:DOL=6:4 volume ratio).

Capacity of the coin cell thus manufactured was measured from 1.8 V to 2.6 V using a charge/discharge measuring device. Specifically, a cell test was proceeded by 0.1/0.1, 0.3/0.3, 0.5/0.5 charging/discharging. At this time, the results are shown in FIG. 4.

Figure 4:
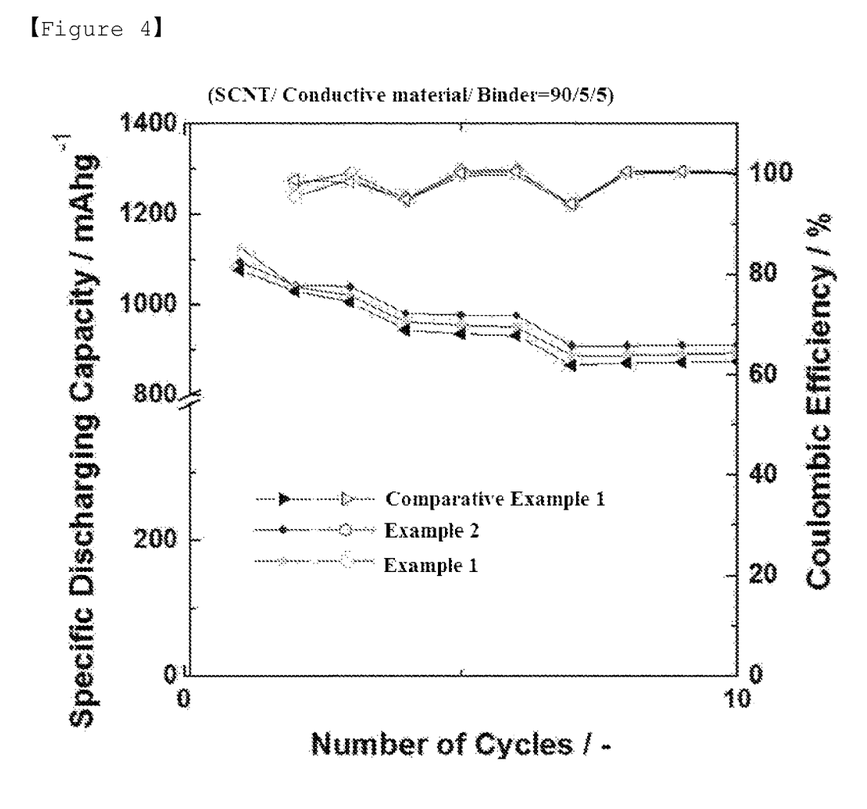
FIG. 4 is a graph showing discharge capacity and life characteristic of Lithium-Sulfur batteries manufactured using the sulfur-carbon composites according to Examples and Comparative Example of the present invention.

Referring to FIG. 4, it can be found that the Lithium-Sulfur batteries manufactured using the sulfur-carbon composites prepared in Example 1 and Example 2 had improved discharge capacity and life characteristic, compared with the Lithium-Sulfur battery manufactured using the composite of Comparative Example 1. Through this, it can be found that the sulfur of the highly reactive β-monoclinic sulfur phase is coated on the inside of the composite as shown in the present invention, and therefore, the non-conductive sulfur is uniformly coated and the internal reactivity is increased.

The invention claimed is:

1. A method for preparing a sulfur-carbon composite comprising the following steps of:
   (a) stirring a porous carbon material in a solvent mixture comprising a carbonate compound and a volatile solvent, and then drying; and
   (b) mixing the porous carbon material produced in (a) with sulfur, and then depositing the sulfur on a portion of a surface of and inside a portion of pores of the porous carbon material by subjecting the mixture to a heat melting method.

2. The method for preparing a sulfur-carbon composite of claim 1, wherein the carbonate compound is at least one selected from the group consisting of propylene carbonate, methylene carbonate, ethylene carbonate and butylene carbonate.

3. The method for preparing a sulfur-carbon composite of claim 1, wherein the porous carbon material is at least one selected from the group consisting of graphite, graphene, carbon black, carbon nanotube, carbon fiber and activated carbon.

4. The method for preparing a sulfur-carbon composite of claim 1, wherein the volatile solvent is at least one selected from the group consisting of ethanol and tetrahydrofuran (THF).

5. The method for preparing a sulfur-carbon composite of claim 1, wherein the solvent mixture contains the carbonate compound in an amount of 0.1 wt % to 10 wt % based on the total solvent mixture.

6. The method for preparing a sulfur-carbon composite of claim 1, wherein a proportion of β-monoclinic sulfur phase to sulfur contained in the sulfur-carbon composite is 90% or more based on a total molar ratio of the sulfur.

7. The method for preparing a sulfur-carbon composite of claim 1, wherein the sulfur and the porous carbon material are mixed at a weight ratio of 9:1 to 5:5.

8. A method for preparing a sulfur-carbon composite comprising the following steps of:
   (a) mixing and stirring a porous carbon material and sulfur in a solvent mixture comprising a carbonate compound and a volatile solvent, and then drying; and
   (b) depositing the sulfur on a portion of a surface of and inside a portion of pores of the porous carbon material by subjecting the resulting mixture of (a) to a heat melting method.

9. The method for preparing a sulfur-carbon composite of claim 8, wherein the carbonate compound is at least one selected from the group consisting of propylene carbonate, methylene carbonate, ethylene carbonate and butylene carbonate.

10. The method for preparing a sulfur-carbon composite of claim 8, wherein the porous carbon material is at least one selected from the group consisting of graphite, graphene, carbon black, carbon nanotube, carbon fiber and activated carbon.

11. The method for preparing a sulfur-carbon composite of claim 8, wherein the volatile solvent is at least one selected from the group consisting of ethanol and tetrahydrofuran (THF).

12. The method for preparing a sulfur-carbon composite of claim 8, wherein the solvent mixture contains the carbonate compound in an amount of 0.1 wt % to 10 wt % based on the total solvent mixture.

13. The method for preparing a sulfur-carbon composite of claim 8, wherein a proportion of β-monoclinic sulfur phase to sulfur contained in the sulfur-carbon composite is 90% or more based on a total molar ratio of the sulfur.

14. The method for preparing a sulfur-carbon composite of claim 8, wherein, the sulfur and the porous carbon material are mixed at a weight ratio of 9:1 to 5:5.

15. A sulfur-carbon composite, comprising:
   a porous carbon material; and
   sulfur present in at least a part of an inside of pores of and a part of a surface of the porous carbon material,
   wherein a proportion of β-monoclinic sulfur phase to sulfur contained in the sulfur-carbon composite is 99% or more based on a total molar ratio of the sulfur.

* * * * *